(12) United States Patent
Imatoh

(10) Patent No.: US 11,526,002 B2
(45) Date of Patent: Dec. 13, 2022

(54) IMAGE DISTORTION CORRECTION CIRCUIT AND DISPLAY DEVICE

(71) Applicant: LAPIS Semiconductor Co., Ltd., Yokohama (JP)

(72) Inventor: Yuki Imatoh, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 79 days.

(21) Appl. No.: 17/215,981

(22) Filed: Mar. 29, 2021

(65) Prior Publication Data

US 2021/0302724 A1 Sep. 30, 2021

(30) Foreign Application Priority Data

Mar. 30, 2020 (JP) .............. JP2020-061149

(51) Int. Cl.
H04N 9/31 (2006.01)
G03B 21/14 (2006.01)
G06T 3/00 (2006.01)
G02B 27/00 (2006.01)
G06T 5/00 (2006.01)
B60K 35/00 (2006.01)
G02B 27/01 (2006.01)

(52) U.S. Cl.
CPC .......... *G02B 27/0025* (2013.01); *B60K 35/00* (2013.01); *G02B 27/0101* (2013.01); *G06T 5/006* (2013.01); *B60K 2370/334* (2019.05); *B60K 2370/90* (2019.05)

(58) Field of Classification Search
CPC .... G03B 21/147; G03B 21/14; G03B 21/142; H04N 9/3185; G02B 2027/011; B60K 35/00; G06T 3/0093; G06T 5/006
See application file for complete search history.

(56) References Cited

FOREIGN PATENT DOCUMENTS

JP 2019161346 A 9/2019
KR 10-2018-0024083 * 3/2018

* cited by examiner

*Primary Examiner* — Ryan D Howard
(74) *Attorney, Agent, or Firm* — Rabin & Berdo, P.C.

(57) ABSTRACT

An image distortion correction circuit performs a distortion correction process on an image signal on the basis of distortion correction data to generate a distortion-corrected image signal. The distortion correction data is for correcting coordinate positions of display data fragments corresponding to respective N coordinate positions in the display image to first to N-th distortion correction coordinate positions. The image distortion correction circuit determines a distortion correction coordinate position where abnormality occurs as an abnormal coordinate position among the first to N-th distortion correction coordinate positions on the basis of respective intervals between the adjacent first to N-th distortion correction coordinate positions indicated by the distortion correction data. The image distortion correction circuit corrects a part corresponding to the abnormal coordinate position in the distortion correction data on the basis of at least the two distortion correction coordinate positions excluding the abnormal coordinate position among the first to N-th distortion correction coordinate positions.

7 Claims, 6 Drawing Sheets

| r1 | A1(X,Y) |
|---|---|
| r2 | A2(X,Y) |
| r3 | A3(X,Y) |
| r4 | A4(X,Y) |
| ⋮ | ⋮ |
| r15 | A15(X,Y) |
| r16 | A16(X,Y) |

FIG. 3

IMAGE DISTORTION CORRECTION CIRCUIT AND DISPLAY DEVICE

BACKGROUND

1. Technical Field

The present invention relates to an image distortion correction circuit that corrects distortion of an image and a display device including this image distortion correction circuit.

2. Related Art

As a display mounted to a vehicle, such as an automobile, a head-up display (also referred to as a HUD) that projects various kinds of driving support information, such as navigation information and a vehicle state, to a windshield has been recently productized.

The windshield of the vehicle serving as a projection screen is generally inclined and has a non-planar surface. Therefore, to provide a driver with an image without distortion when an image is projected to the windshield, the HUD device performs image distortion correction that corrects distortion of the projection image generated due to the inclination and the non-planar shape of the windshield on an image signal representing the driving support information.

A circuit device performing a mapping process that moves a coordinate position of each pixel in an image based on an image signal corresponding to a shape and an inclination of a projection target, such as a windshield of a vehicle, has been recently proposed as image distortion correction (for example, see JP-A-2019-161346).

The circuit device performs the mapping process on the image signal representing the image to be projected to the windshield of the vehicle in accordance with map data stored in a non-volatile memory. The map data is data indicative of coordinate transformation of each pixel corresponding to a surface shape of a projection target, and is table data that makes each pixel position of an image before a mapping process correspond to each pixel position of the image after the mapping process.

With the circuit device, abnormality that a circuit performing the mapping process becomes vulnerable to noise and malfunctions, the map data itself stored in the non-volatile memory is corrupted, or the like, possibly occurs due to age deterioration or the like.

Therefore, this circuit device includes a so-called abnormality detection function that detects whether the map data and the circuit performing the mapping process using the map data are normal.

SUMMARY

When the map data for distortion correction itself is corrupted, a character, a drawing, or the like representing driving support information is projected to the windshield of the vehicle in a distorted state, and when the distortion is large, visual confirmation may be impossible.

Although the above-described circuit device allows detecting the abnormality, until the abnormal part is repaired, the driving support information projected to the windshield cannot be visually confirmed.

Therefore, an object of the present invention is to provide an image distortion correction circuit and a display device that ensure information display allowing visual confirmation even when abnormality occurs in data for distortion correction.

An image distortion correction circuit according to the present invention is an image distortion correction circuit for a display device that projects a display image based on an input image signal to a projection surface to generate a projection image. The image distortion correction circuit includes a distortion correction circuit, an abnormality determination part, and a data correction part. The distortion correction circuit performs a distortion correction process on the input image signal on the basis of distortion correction data to generate a distortion-corrected image signal to eliminate distortion of the projection image generated on the projection surface. The distortion correction data is for correcting coordinate positions of display data fragments in the input image signal corresponding to respective N (N is an integer of 2 or more) coordinate positions in the display image to first to N-th distortion correction coordinate positions. The abnormality determination part calculates respective intervals between the adjacent first to N-th distortion correction coordinate positions indicated by the distortion correction data and determines a distortion correction coordinate position where abnormality occurs as an abnormal coordinate position among the first to the N-th distortion correction coordinate positions on the basis of the respective intervals. The data correction part corrects a part corresponding to the abnormal coordinate position in the distortion correction data on the basis of at least two distortion correction coordinate positions excluding the abnormal coordinate position among the first to the N-th distortion correction coordinate positions.

A display device according to the present invention is a display device that projects a display image based on an input image signal to a projection surface to generate a projection image. The display device includes a distortion correction circuit, an image irradiation part, an abnormality determination part, and a data correction part. The distortion correction circuit performs a distortion correction process on the input image signal on the basis of distortion correction data to generate a distortion-corrected image signal to eliminate distortion of the projection image generated on the projection surface. The distortion correction data is for correcting coordinate positions of display data fragments in the input image signal corresponding to respective N (N is an integer of 2 or more) coordinate positions in the display image to first to N-th distortion correction coordinate positions. The image irradiation part irradiates a display light to project the projection image based on the distortion-corrected image signal onto the projection surface. The abnormality determination part calculates respective intervals between the adjacent first to N-th distortion correction coordinate positions indicated by the distortion correction data and determines a distortion correction coordinate position where abnormality occurs as an abnormal coordinate position among the first to the N-th distortion correction coordinate positions on the basis of the respective intervals. The data correction part corrects a part corresponding to the abnormal coordinate position in the distortion correction data on the basis of at least two distortion correction coordinate positions excluding the abnormal coordinate position among the first to the N-th distortion correction coordinate positions.

The image distortion correction circuit according to the present invention first performs the distortion correction process on the input image signal on the basis of the distortion correction data to generate the distortion-corrected image signal to eliminate the distortion of the projection image generated on the projection surface when the display image based on the input image signal is projected onto the projection surface. The distortion correction data is to correct the coordinate positions of the display data fragments corresponding to the respective N coordinate positions in the display image to the first to the N-th distortion correction coordinate positions. At this time, the image distortion correction circuit determines the distortion correction coordinate position where the abnormality occurs as the abnormal coordinate position among the first to the N-th distortion correction coordinate positions on the basis of the respective intervals between the adjacent first to N-th distortion correction coordinate positions indicated by the distortion correction data. The image distortion correction circuit corrects the part corresponding to the abnormal coordinate position in the distortion correction data on the basis of at least the two distortion correction coordinate positions excluding the abnormal coordinate position among the first to the N-th distortion correction coordinate positions.

This allows information display allowing visual confirmation with the distortion reduced as an image based on the input image signal even when abnormality occurs in the distortion correction data.

BRIEF DESCRIPTION OF THE DRAWINGS

FIG. 3 is a drawing illustrating a part of a memory map in a table memory 13;

DETAILED DESCRIPTION

Figure 1:
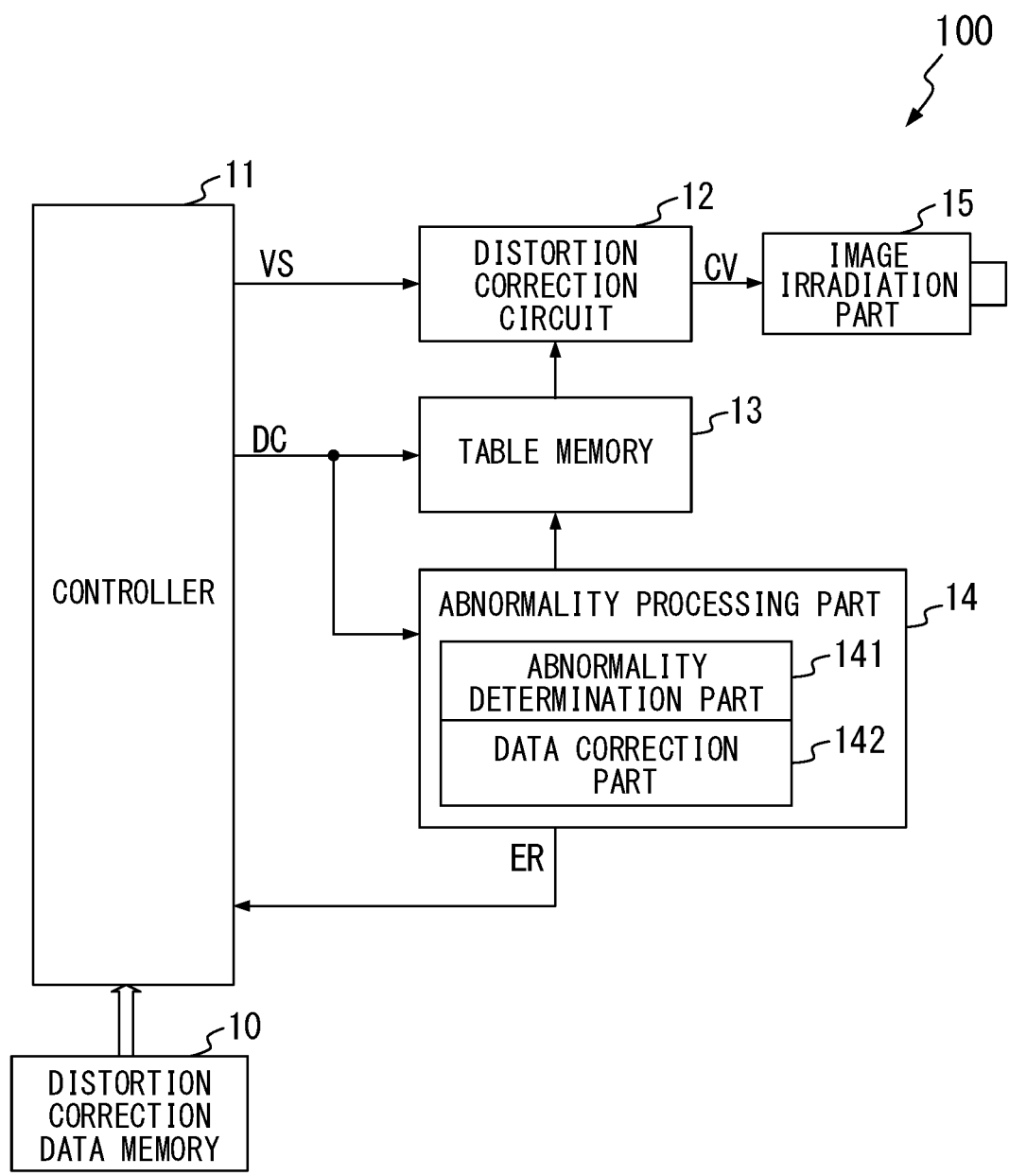
FIG. 1 is a block diagram illustrating a configuration of a head-up display device 100 as a display device including an image distortion correction circuit according to the present invention.

FIG. 1 is a block diagram illustrating a configuration of a head-up display device 100 (hereinafter referred to as a HUD device 100) as a display device including an image distortion correction circuit according to the present invention. The HUD device 100 projects a display image based on input image signal to a projection surface to generate a projection image. As illustrated in FIG. 1, the HUD device 100 includes a distortion correction data memory 10, a controller 11, a distortion correction circuit 12, a table memory 13, an abnormality processing part 14, and an image irradiation part 15.

The controller 11 generates an image signal representing driving support information, such as a behavior of a vehicle, an instantaneous fuel consumption, a state of a battery, and a traveling speed, with a character, a drawing, and the like.

When the controller 11 receives an abnormality detection signal ER indicative of abnormality, the controller 11 generates the image signal representing a display image that includes a character or a drawing notifying the abnormality in the above-described driving support information. The controller 11 supplies the distortion correction circuit 12 with the generated image signal, that is, an image signal formed of a series of display data fragments representing a luminance level of each pixel of the above-described display image as an input image signal VS.

When the power is turned on, the controller 11 reads distortion correction data stored in the distortion correction data memory 10. Whenever a predetermined period passes after the power is turned on, the controller 11 may read the distortion correction data from the distortion correction data memory 10.

The distortion correction data is data that treats a plurality of pixels selected from all pixels as base-point pixels and maps (converts) coordinate positions of the display data fragment corresponding to respective base-point pixels in one frame to another coordinate position so as to correct distortion occurred in an image projected to a projection target.

Figure 2:
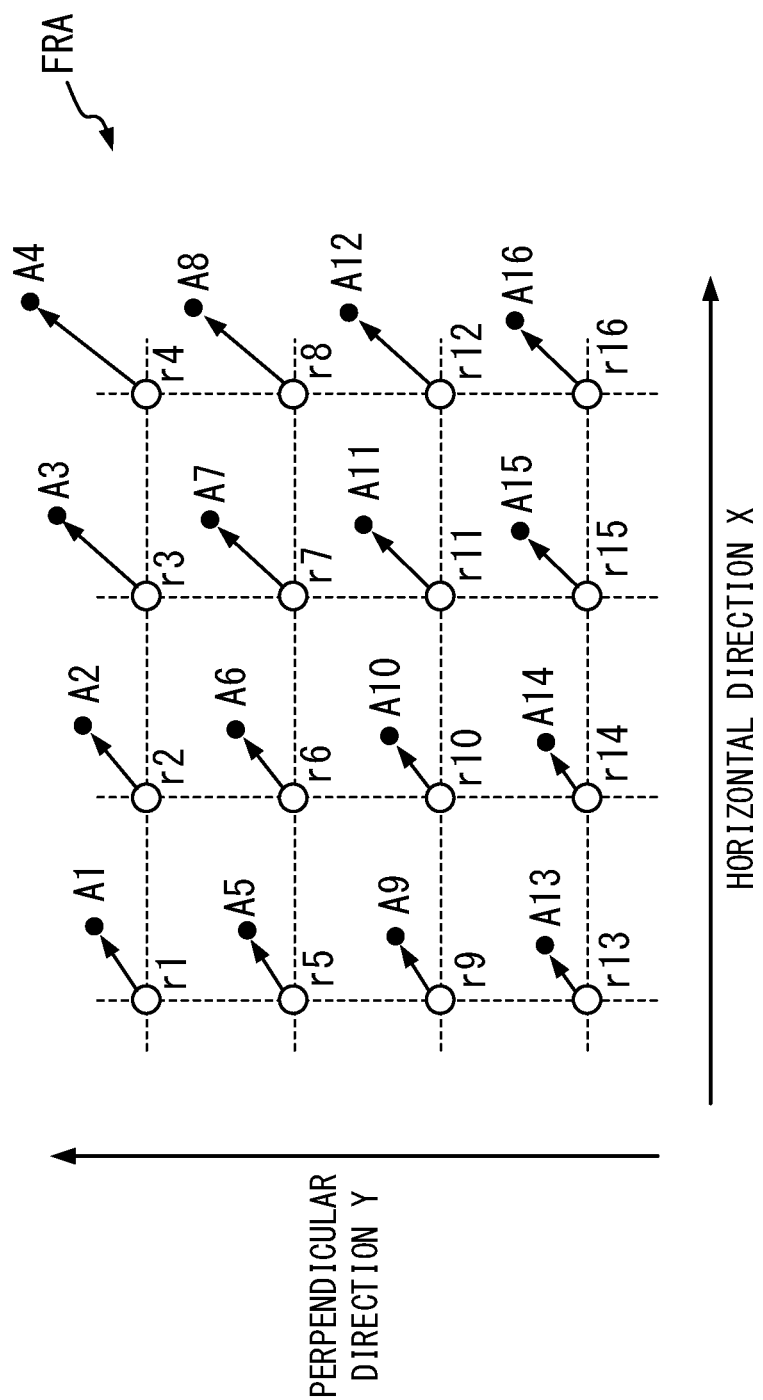
FIG. 2 is a drawing illustrating an example of a positional relationship between base-point pixels r1 to r16 represented by distortion correction data and distortion correction coordinate positions A1 to A16 after mapping corresponding to the respective base-point pixels.

FIG. 2 is a drawing illustrating an example of base-point pixels r1 to r16 as an example of the plurality of base-point pixels represented by the distortion correction data and an example of distortion correction coordinate positions A1 to A16 after the mapping process corresponding to the respective base-point pixels. The example illustrated in FIG. 2 indicates the 16 base-point pixels r1 to r16 preliminarily set in a one-frame display image FRA based on the input image signal VS by white circles, and indicates the distortion correction coordinate positions A1 to A16 corresponding to the respective display data fragments in the projection image by black circles. As illustrated in FIG. 2, each of the distortion correction coordinate positions A1 to A16 represents a coordinate position (X, Y) in a horizontal direction X and a perpendicular direction Y in the one-frame image FRA. In the example illustrated in FIG. 2, it is assumed that the respective base-point pixels r1 to r16 are disposed at coordinate positions of intersection portions of a mesh indicated by the dashed lines and are disposed to be separated from one another at regular intervals in the respective horizontal direction X and perpendicular direction Y in the one-frame image FRA based on the input image signal VS.

The controller 11 causes the table memory 13 to store the distortion correction data read from the distortion correction data memory 10 as distortion correction data DC and supplies it to the abnormality processing part 14. As illustrated in FIG. 3, in the table memory 13, the distortion correction coordinate positions A1 to A16, which are made correspond to the above-described respective base-point pixels r1 to r16 and indicated by the distortion correction data DC, are made correspond to the respective coordinate positions (X, Y) of the base-point pixels r1 to r16, and stored.

The distortion correction circuit 12 reads the distortion correction data from the table memory 13. The distortion correction circuit 12 performs the mapping process on the input image signal VS on the basis of the distortion correction data to change the coordinate positions (X, Y) of the display data fragment corresponding to each pixel so as to eliminate the distortion in the projected image. That is, the distortion correction circuit 12 first calculates coordinate positions after the change at the display data fragments corresponding to all respective pixels in the one-frame image by, for example, interpolation operation based on the distortion correction coordinate positions A1 to A16. The distortion correction circuit 12 generates content of each pixel represented by the input image signal VS, that is, a signal in which each coordinate position of the display data fragment representing the luminance level at each coordinate position is mapped to the coordinate position after the change as the distortion-corrected image signal CV on which the distortion correction has been performed, and supplies it to the image irradiation part 15.

The image irradiation part 15 irradiates a display light to project the image indicated by the distortion-corrected image signals CV to the projection target, such as a windshield of a vehicle. The image irradiation part 15 may include an optical system that optically corrects distortion when this image has been projected.

The abnormality processing part 14 includes an abnormality determination part 141 and a data correction part 142.

The abnormality determination part 141 determines whether abnormality occurs in the distortion correction data DC. That is, the abnormality processing part 14 determines whether the distortion correction data itself stored in the distortion correction data memory 10 is corrupted, or abnormality, such as a bit error, occurs in the distortion correction data DC. When the abnormality processing part 14 determines the abnormality as described above occurs in the distortion correction data DC, the abnormality processing part 14 supplies a signal indicative of the fact to the controller 11 as the above-described abnormality detection signal ER.

When abnormality occurs in the distortion correction data DC, the data correction part 142 identifies the abnormal part in the distortion correction data DC and corrects the abnormal part. The abnormality determination part 141 rewrites the memory contents of the abnormal part in the table memory 13 into contents after the above-described correction.

Details of operations of the abnormality determination part 141 and the data correction part 142 will be described below.

The distortion correction data DC is assumed to represent the distortion correction coordinate positions A1 to A16 corresponding to the base-point pixels r1 to r16 illustrated in FIG. 2, respectively. The distortion correction coordinate positions A1 to A16 relative to the base-point pixels r1 to r16 are determined by a curve shape and a mounted angle of the projection target. A distance between each of the distortion correction coordinate positions A1 to A16 and the base-point pixels r each corresponding to the distortion correction coordinate positions A1 to A16 is equal to or less than a maximum distance (hereinafter, a predetermined distance) determined by the curve shape and the mounted angle of the projection target.

Figure 4:
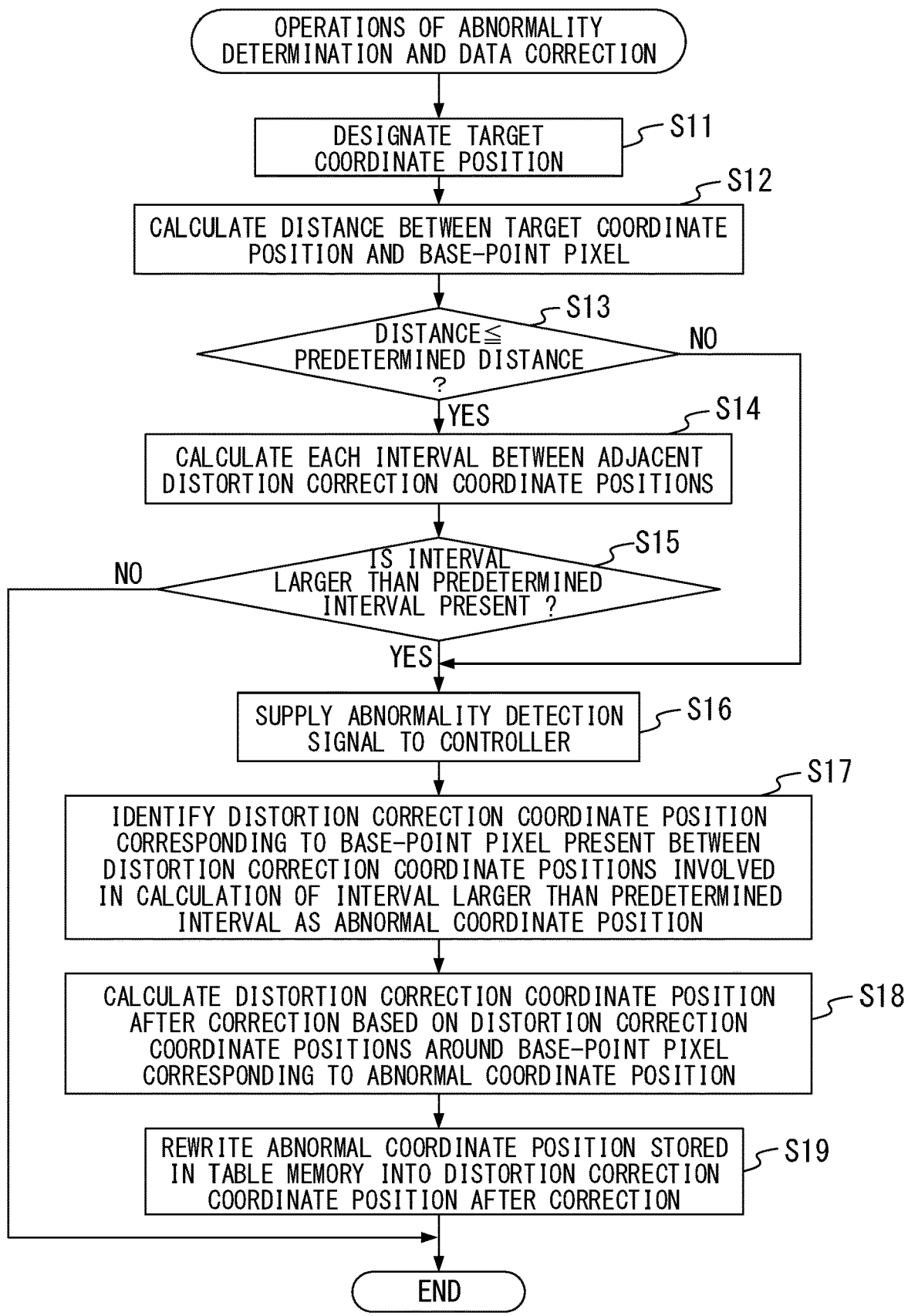
FIG. 4 is a flowchart depicting a procedure for abnormality determination/data correction routine.

The abnormality determination part 141 performs an operation following an operational flow depicted in FIG. 4 whenever the abnormality determination part 141 receives new distortion correction data DC from the controller 11.

In FIG. 4, the abnormality determination part 141 first designates at least one distortion correction coordinate position A among the distortion correction coordinate positions A1 to A16 indicated by the distortion correction data DC as a target coordinate position (Step S11).

Next, the abnormality determination part 141 calculates the distance between the base-point pixel r as the base-point of the target coordinate position and this target coordinate position on the basis of the respective coordinate positions (X, Y) (Step S12). The abnormality determination part 141 determines whether this calculated distance is equal to or less than the above-described predetermined distance (Step S13).

Figure 5:
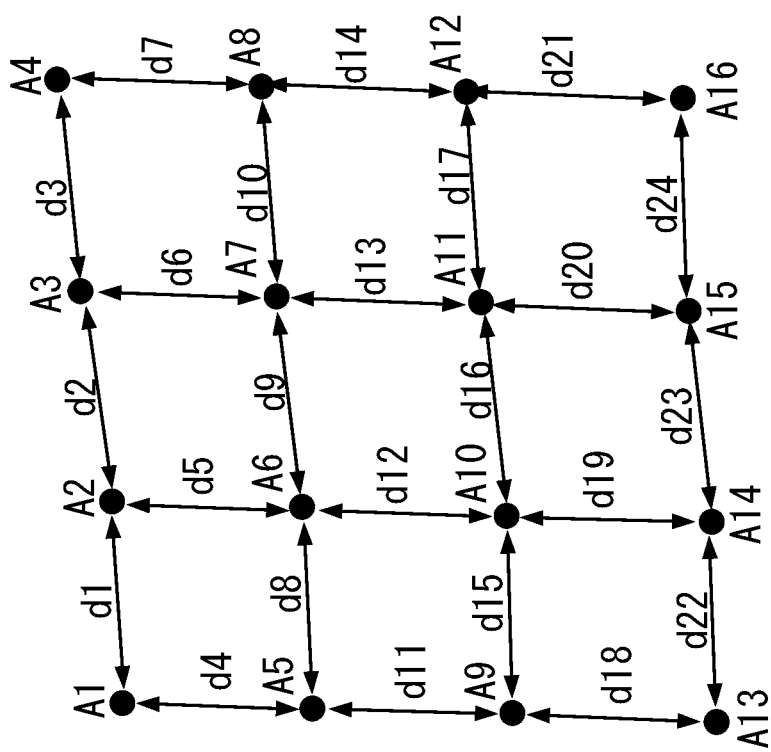
FIG. 5 is a drawing representing intervals between the adjacent distortion correction coordinate positions A at the distortion correction coordinate positions A1 to A16 when abnormality does not occur.

When determined as equal to or less than the predetermined distance at Step S13, as illustrated in FIG. 5, the abnormality determination part 141 calculates intervals d1 to d24 between the distortion correction coordinate positions A mutually adjacent to the upper, lower, left, or right (Step S14). When abnormality does not occur in the distortion correction coordinate positions A1 to A16, each of the intervals d1 to d24 between the distortion correction coordinate positions A adjacent to one another becomes equal to or less than a predetermined interval having a length found by adding a predetermined margin to the interval of the mesh illustrated in FIG. 2 or less.

Next, the abnormality determination part 141 determines whether the interval d larger than the above-described predetermined interval is present among the intervals d1 to d24 between the distortion correction coordinate positions A adjacent to one another (Step S15).

At Step S15, when absence of the interval d larger than the predetermined interval is determined, the abnormality determination part 141 determines that abnormality is absent, exits the operational flow depicted in FIG. 4, and enters a standby state of new distortion correction data DC.

Meanwhile, when the presence of the interval d larger than the predetermined interval is determined at Step S15, or when the distance between the base-point pixel r as the base-point of the target coordinate position and the target coordinate position is determined as larger than the predetermined distance at Step S13, the abnormality determination part 141 determines that abnormality is present and supplies the abnormality detection signal ER to the controller 11 (Step S16).

When the presence of abnormality has been determined, the data correction part 142 identifies the distortion correction coordinate position A corresponding to the base-point pixel r present between the coordinate positions involved in the calculation of the interval d larger than the predetermined interval as the abnormal coordinate position among the distortion correction coordinate positions A1 to A16 (Step S17).

Next, the data correction part 142 calculates coordinate positions after correction for the abnormal coordinate position by, for example, linear interpolation operation using at least two coordinate positions adjacent to around the base-point pixel r corresponding to the abnormal coordinate position (Step S18).

Next, the data correction part 142 rewrites this abnormal coordinate position stored in the table memory 13 into the coordinate position after correction calculated at Step S18 to correct the abnormal coordinate position (Step S19).

After performing Step S19, the abnormality processing part 14 exits the operational flow depicted in FIG. 4 and enters the standby state for new distortion correction data DC.

Thus, first, the abnormality determination part 141 determines whether abnormality in which the distortion correction coordinate positions A1 to A16 indicated by the distortion correction data DC all become an identical fixed value (including zero) occurs (S11 to S13). For example, in a case where the distortion correction coordinate positions A1 to A16 all indicate the coordinate position (0, 0), the distance between at least one target coordinate position among the distortion correction coordinate positions A1 to A16 and the base-point pixel r as its base-point becomes larger than the predetermined distance. Accordingly, the abnormality determination part 141 determines that the distance between the target coordinate position and the base-point pixel r is larger than the predetermined distance as the above-described determination result, and continuously supplies the abnormality detection signal ER indicative of the presence of abnormality to the controller 11 (S16).

When the abnormality in which the distortion correction coordinate positions A1 to A16 all become the identical fixed value does not occur, the abnormality determination part 141 continuously determines whether the abnormal distortion correction coordinate position A causing a missing of an image at the phase of the mapping process by the distortion correction circuit 12 is present among the distortion correction coordinate positions A1 to A16.

Specifically, the abnormality determination part 141 determines whether the interval d larger than the predetermined interval is present among the respective intervals d between the distortion correction coordinate positions A adjacent to one another to the upper, lower, left, and right (S15). When the presence of the interval larger than the predetermined interval is determined, the presence of the abnormal coordinate position is determined, and the abnormality determination part 141 supplies the abnormality detection signal ER indicative of the abnormality to the controller 11 (S16).

When the interval d larger than the predetermined interval is present among the intervals d between the distortion correction coordinate positions A adjacent to one another to the upper, lower, left, and right, the data correction part 142 identifies the abnormal coordinate position among the distortion correction coordinate positions A1 to A16.

Figure 6:
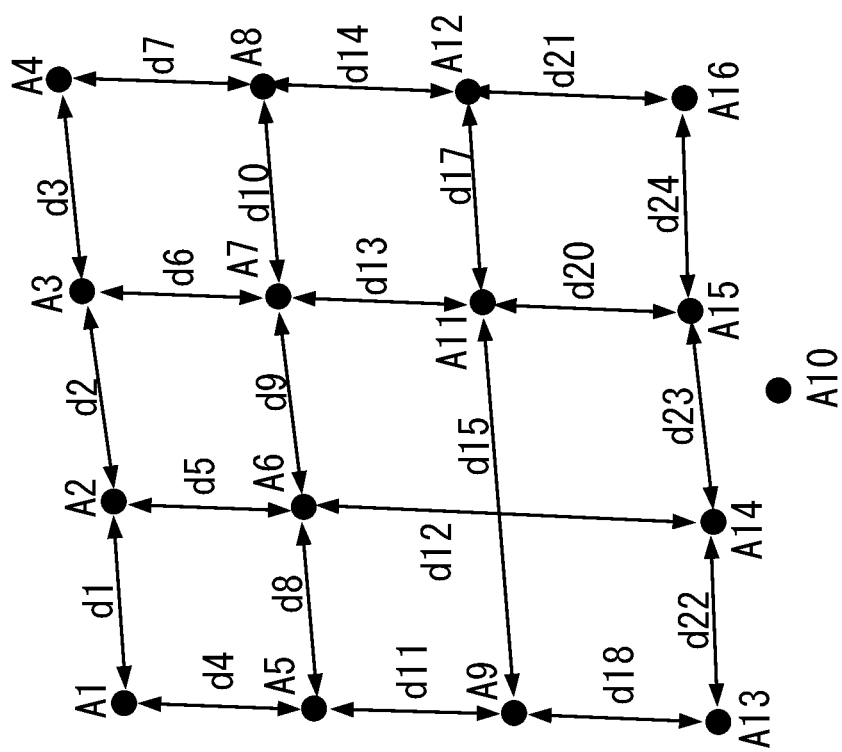
FIG. 6 is a drawing illustrating an example of an arrangement configuration when abnormality occurs in the distortion correction coordinate position A10 among the distortion correction coordinate positions A1 to A16.

The operation of identifying the abnormal coordinate position by the data correction part 142 will be described below assuming a case where abnormality in which, as illustrated in FIG. 6, the distortion correction coordinate position A10 corresponding to the base-point pixel r10 is positioned lower than the distortion correction coordinate positions A14 and A15 occurs. All of the interval d8 between the distortion correction coordinate positions A5 and A6, the interval d9 between the distortion correction coordinate positions A6 and A7, the interval d11 between the distortion correction coordinate positions A5 and A9, and the interval d13 between the distortion correction coordinate positions A7 and A11 illustrated in FIG. 6 are the predetermined interval or less.

In FIG. 6, since the distortion correction coordinate position A10, which should be originally present between the distortion correction coordinate position A6 and the distortion correction coordinate position A14 below the distortion correction coordinate position A6, is absent, the interval d12 between the distortion correction coordinate positions A6 and A14 adjacent to one another in the up-down direction becomes larger than the predetermined interval. Additionally, since the distortion correction coordinate position A10, which should be originally present between the distortion correction coordinate position A9 and the distortion correction coordinate position A11 to the right of the distortion correction coordinate position A9, is absent, the interval d15 between the distortion correction coordinate positions A9 and A11 adjacent to one another in the right-left direction becomes larger than the predetermined interval.

Therefore, the data correction part 142 identifies the distortion correction coordinate position A10 corresponding to the base-point pixel r10 between the distortion correction coordinate positions A6 (or A9) and A14 (or A11) involved in the calculation of this interval d12 (or d15) as the abnormal coordinate position (S17). Next, the data correction part 142 calculates the coordinate position after correction for the abnormal coordinate position by, for example, interpolation operation based on at least two coordinate positions (for example, A5 to A7, A9, A11, A13 to A15, and the like) adjacent around the base-point pixel r10 corresponding to this abnormal coordinate position (A10) (S18). The data correction part 142 rewrites the coordinate position (A10 illustrated in FIG. 6) of the abnormal coordinate position stored in the table memory 13 into this calculated coordinate position after correction to correct the abnormal coordinate position. Thus, for example, as illustrated in FIG. 6, even when abnormality occurs in the distortion correction coordinate position A10 in the distortion correction data DC, the distortion correction data stored in the table memory 13 is corrected to the state as illustrated in FIG. 5.

Accordingly, with the HUD device 100, even when abnormality, such as corruption of the distortion correction data itself stored in the distortion correction data memory 10 and a bit error in the distortion correction data, occurs, the information display that allows visual confirmation without distortion can be performed as the projection image based on the image signals VS.

Additionally, when abnormality occurs in the distortion correction data, the abnormality processing part 14 corrects the abnormal part as described above and supplies the abnormality detection signal ER indicative of the abnormality to the controller 11. Accordingly, the HUD device 100 causes one produced by superimposing a drawing or character information notifying the abnormality in the distortion correction data on information to be originally provided to the user to be displayed on the projection target, such as a windshield of a vehicle, as the projection image.

While the embodiment performs the interpolation operation using at least the two distortion correction coordinate positions A around the base-point pixel r corresponding to this abnormal coordinate position for calculation of the coordinate position after correction for the abnormal coordinate position, the configuration is not limited to this. For example, the coordinate position after correction for the abnormal coordinate position may be calculated on the basis of an average value of the eight distortion correction coordinate positions A adjacent around the base-point pixel r corresponding to the abnormal coordinate position. The coordinate position after correction for the abnormal coordinate position may be calculated on the basis of an average value of gradients of the two distortion correction coordinate positions A between which the base-point pixel r corresponding to the abnormal coordinate position is interposed vertically or horizontally.

In the embodiment, while abnormality is detected on the basis of intervals between the respective adjacent distortion correction coordinate positions A1 to A16 represented by the distortion correction data DC, abnormality may be detected using an error-detection code, such as Cyclic Redundancy Check (CRC). For example, the distortion correction data to which CRC bits are added is employed and stored in the distortion correction data memory 10. The abnormality processing part 14 compares a value obtained by performing the CRC operation on the distortion correction data DC supplied from the controller 11 with a preliminarily configured expected value, and when both are mutually different, the abnormality processing part 14 supplies the abnormality detection signal ER to the controller 11.

In the embodiment, while the numbers of the base-point pixels and the coordinate positions represented by the distortion correction data are 16, the numbers are not limited to 16.

The HUD device 100 needs not to include the controller 11 or the image irradiation part 15.

In short, the HUD device 100 only needs to include the following distortion correction circuit, abnormality determination part, and data correction part as the image distortion correction circuit to eliminate the distortion of the projection image obtained when the display image based on the input image signal is projected onto the projection surface.

That is, the distortion correction circuit (12) performs the distortion correction process on the input image signal on the basis of distortion correction data (DC) and generates the distortion-corrected image signal (CV) to eliminate distortion of the projection image. The distortion correction data (DC) is to correct the coordinate positions of the display data fragments in the input image signal (VS) corresponding to respective N (N is an integer of 2 or more) coordinate positions in the display image to the first to the N-th distortion correction coordinate positions (for example, A1 to A16). The abnormality determination part (14) calculates respective intervals (for example, d1 to d24) between the adjacent first to N-th distortion correction coordinate positions indicated by the distortion correction data. The abnormality determination part (14) determines the distortion correction coordinate position where abnormality occurs as the abnormal coordinate position among the first to the N-th distortion correction coordinate positions on the basis of the respective intervals. The data correction part (14) corrects the part corresponding to the abnormal coordinate position in the distortion correction data on the basis of at least two distortion correction coordinate positions excluding the abnormal coordinate position among the first to the N-th distortion correction coordinate positions.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims. This application is based upon and claims the benefit of priority from the prior Japanese Patent Application No. 2020-61149 filed on Mar. 30, 2020, the entire contents of which are incorporated herein by reference.

What is claimed is:

1. An image distortion correction circuit for a display device that projects a display image based on an input image signal to a projection surface to generate a projection image, the image distortion correction circuit comprising:
    a distortion correction circuit that performs a distortion correction process on the input image signal on the basis of distortion correction data to generate a distortion-corrected image signal so as to eliminate distortion of the projection image generated on the projection surface, the distortion correction data being for correcting coordinate positions of display data fragments in the input image signal corresponding to respective N (N is an integer of 2 or more) coordinate positions in the display image to first to N-th distortion correction coordinate positions;
    an abnormality determination part that calculates respective intervals between the adjacent first to N-th distortion correction coordinate positions indicated by the distortion correction data and determines a distortion correction coordinate position where abnormality occurs as an abnormal coordinate position among the first to the N-th distortion correction coordinate positions on the basis of the respective intervals; and
    a data correction part that corrects apart corresponding to the abnormal coordinate position in the distortion correction data on the basis of at least two distortion correction coordinate positions excluding the abnormal coordinate position among the first to the N-th distortion correction coordinate positions.

2. The image distortion correction circuit according to claim 1, wherein
    when an interval larger than a predetermined interval is present among the respective intervals, the abnormality determination part determines that abnormality occurs at a distortion correction coordinate position corresponding to the one coordinate position present between at least the two distortion correction coordinate positions involved in the calculation of the interval larger than the predetermined interval.

3. The image distortion correction circuit according to claim 1, wherein
    when an interval larger than a predetermined interval is present among the respective intervals, the abnormality determination part outputs an abnormality detection signal indicative of abnormality.

4. The image distortion correction circuit according to claim 2, wherein
    the data correction part calculates a distortion correction coordinate position after the correction for the abnormal coordinate position by interpolation operation between two distortion correction coordinate positions between which the one coordinate position is interposed among the respective distortion correction coordinate positions excluding the abnormal coordinate position among the first to the N-th distortion correction coordinate positions.

5. The image distortion correction circuit according to claim 2, wherein
    the data correction part calculates a distortion correction coordinate position after the correction for the abnormal coordinate position by averaging eight distortion correction coordinate positions adjacent around the one coordinate position among the respective distortion correction coordinate positions excluding the abnormal coordinate position among the first to the N-th distortion correction coordinate positions.

6. The image distortion correction circuit according to claim 4, comprising
    a memory that stores the distortion correction data, wherein
    the data correction part rewrites the abnormal coordinate position indicated by the distortion correction data stored in the memory into the distortion correction coordinate position after the correction.

7. A display device that projects a display image based on an input image signal to a projection surface to generate a projection image, the display device comprising:
    a distortion correction circuit that performs a distortion correction process on the input image signal on the basis of distortion correction data to generate a distortion-corrected image signal to eliminate distortion of the projection image generated on the projection surface, the distortion correction data being for correcting coordinate positions of display data fragments in the input image signal corresponding to respective N (N is an integer of 2 or more) coordinate positions in the display image to first to N-th distortion correction coordinate positions;

an image irradiation part that irradiates a display light to project the projection image based on the distortion-corrected image signal onto the projection surface;

an abnormality determination part that calculates respective intervals between the adjacent first to N-th distortion correction coordinate positions indicated by the distortion correction data and determines a distortion correction coordinate position where abnormality occurs as an abnormal coordinate position among the first to the N-th distortion correction coordinate positions on the basis of the respective intervals; and a data correction part that corrects apart corresponding to the abnormal coordinate position in the distortion correction data on the basis of at least two distortion correction coordinate positions excluding the abnormal coordinate position among the first to the N-th distortion correction coordinate positions.

\* \* \* \* \*